United States Patent
Harrison et al.

(10) Patent No.: US 10,834,358 B1
(45) Date of Patent: Nov. 10, 2020

(54) ENHANCING VIDEO QUALITY BASED ON METADATA AT A CLIENT DEVICE HAVING MORE PROCESSING POWER IN A SYSTEM OF CLIENT DEVICES HAVING DIFFERENT AMOUNTS OF PROCESSING POWER

(71) Applicant: Facebook, Inc., Menlo Park, CA (US)

(72) Inventors: Jason Francis Harrison, San Jose, CA (US); Timo Juhani Ahonen, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/237,130

(22) Filed: Dec. 31, 2018

(51) Int. Cl.
*H04N 7/14* (2006.01)
*H04N 5/262* (2006.01)

(52) U.S. Cl.
CPC .......... *H04N 7/147* (2013.01); *H04N 5/2628* (2013.01)

(58) Field of Classification Search
USPC ...................................................... 348/14.12
See application file for complete search history.

(56) References Cited

U.S. PATENT DOCUMENTS

| 2010/0214419 A1* | 8/2010 | Kaheel | H04N 7/17318 348/207.1 |
| 2014/0226901 A1* | 8/2014 | Spracklen | G06F 3/1454 382/167 |

\* cited by examiner

*Primary Examiner* — Amal S Zenati
(74) *Attorney, Agent, or Firm* — Fenwick & West LLP (57) ABSTRACT

A system includes multiple client devices that are capable of capturing and displaying video data, in which at least two of the client devices have different amounts of processing power. A connection is established at a client device having more processing power to a client device having less processing power. The client device having more processing power receives video data captured by the client device having less processing power as well as metadata associated with the video data via the connection as the video data are being captured by the client device having less processing power. The client device having more processing power processes the video data based on the metadata associated with the video data within a duration of the connection, thereby enhancing a quality of the video data. The processed video data are then displayed at the client device having more processing power.

20 Claims, 5 Drawing Sheets

ENHANCING VIDEO QUALITY BASED ON METADATA AT A CLIENT DEVICE HAVING MORE PROCESSING POWER IN A SYSTEM OF CLIENT DEVICES HAVING DIFFERENT AMOUNTS OF PROCESSING POWER

BACKGROUND

This disclosure relates generally to enhancing video quality at a client device, and more specifically to enhancing video quality based on metadata at a client device having more processing power in a system of client devices having different amounts of processing power.

Various types of client devices (e.g., mobile phones, tablets, laptops, smart TVs, video phones, etc.) that are capable of capturing and displaying video data and/or capturing and playing audio data also are capable of establishing connections with each other to transmit and receive video data and/or audio data. These client devices allow users of the client devices at different locations to communicate with each other in real-time (e.g., via video telephony). For example, a user of a video phone may make a video call to another user of a mobile phone, in which each user is able to view a video stream of the other user and to hear the other user in real-time. As an additional example, a user of a laptop computer may join and participate in a video conference with two or more additional users of laptop and desktop computers.

Conventionally, when video data and/or audio data are captured by such client devices, the client devices perform various types of processing on the data before communicating the data to other client devices to which they are connected. This processing may be performed to enhance the quality of the video data (e.g., by enhancing the video's resolution) and/or to enhance the quality of the audio data (e.g., by reducing the volume of background noises). For example, suppose that a mobile device (e.g., a mobile phone) running a video messaging application has established a connection to make a video call to a video messaging device (e.g., a video phone). In this example, the mobile device may process video data it captures (e.g., to correct colors, to stabilize images, etc.) before sending the video data to the video messaging device. Similarly, in this example, the video messaging device also may process video data it captures before sending the video data to the mobile device. In the above example, both the mobile device and the video messaging device may process audio data they capture (e.g., by reducing background noises, echo, and/or reverberation) before sending the audio data to the other device.

Oftentimes, client devices that have established connections to communicate video data and/or audio data to each other may have different amounts of processing power (e.g., CPU). In the above example, the mobile device may have less processing power than the video messaging device. Due to this asymmetry in processing power, different amounts of time may be required to process video data and/or audio data at different client devices, which may degrade user experience. In the above example, since the mobile device has less processing power than the video messaging device, the video messaging device may experience a greater delay in the receipt of video data and audio data than the mobile device, which may be disruptive to the ability of the users of the devices to communicate with each other. Furthermore, in this example, if the mobile device also is performing other types of processing (e.g., in other applications running on the mobile device), the delay may be even more pronounced.

SUMMARY

Conventionally, when video data and/or audio data are captured by client devices that are capable of establishing connections with each other to transmit and receive this data, the client devices perform various types of processing on the data before communicating the data to other client devices to enhance the quality of the data. Oftentimes, client devices that have established connections to communicate video data and/or audio data to each other may have different amounts of processing power. Due to this asymmetry in processing power, different amounts of time may be required to process video data and/or audio data at different client devices, which may degrade user experience.

To improve the user experience of users communicating via such client devices, in a system including multiple client devices that are capable of capturing and displaying video data and/or audio data, in which at least two of the client devices have different amounts of processing power, a client device having more processing power processes video data based on metadata associated with the video data to enhance the quality of the video data prior to displaying the video data. More specifically, a connection is established at the client device having more processing power to a client device having less processing power. The client device having more processing power receives video data captured by the client device having less processing power via the connection. The client device having more processing power also receives metadata associated with the video data from the client device having less processing power via the connection. The client device having more processing power processes the video data based on the metadata associated with the video data within a duration of the connection, thereby enhancing a quality of the video data (e.g., via image stabilization, color correction, resolution enhancement, reduction of background motion, etc.). The processed video data are then displayed at the client device having more processing power. In some embodiments, audio data captured by the client device having less processing power may be processed in an analogous manner based on metadata associated with the audio data to enhance a quality of the audio data (e.g., via reduction or cancellation of background noises, echo, and/or reverberation). In such embodiments, the processed audio data may then be played at the client device having more processing power.

In various embodiments, once a connection is established at the client device having more processing power to the client device having less processing power, the client device having more processing power captures video data and metadata associated with the video data and processes the video data based on the metadata associated with the video data within a duration of the connection. In such embodiments, the processed video data are transmitted to the client device having less processing power via the connection and then displayed at the client device having less processing power. Furthermore, in such embodiments, audio data captured by the client device having more processing power also may be processed based on metadata associated with the audio data to enhance a quality of the audio data. The processed audio data may then be transmitted to the client device having less processing power via the connection and played at the client device having less processing power.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
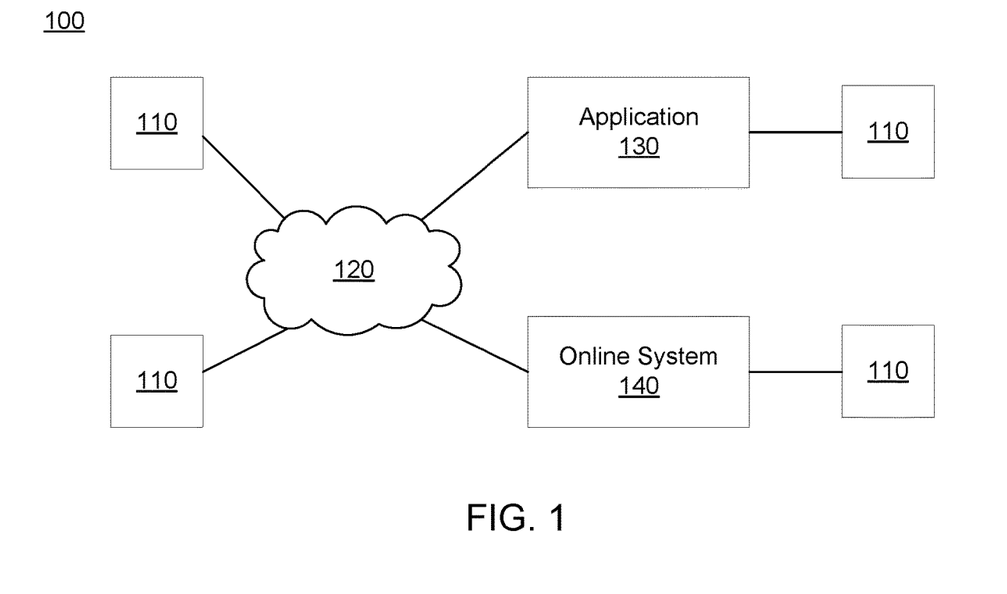
FIG. 1 is a block diagram of a system environment including multiple client devices, in accordance with an embodiment.

FIG. 1 is a block diagram of a system environment 100 including multiple client devices 110. The system environment 100 shown by FIG. 1 comprises two or more client devices 110, a network 120, one or more applications 130, and one or more online systems 140. In alternative configurations, different and/or additional components may be included in the system environment 100.

The client devices 110 are one or more computing devices capable of capturing and displaying video data and/or capturing and playing audio data. The client devices 110 also are capable of establishing connections (e.g., Bluetooth connections, VoIP connections, etc.) with each other to transmit and receive various types of data (e.g., processed and/or unprocessed video data, processed and/or unprocessed audio data, and metadata associated with video data and/or audio data). At least two of the client devices 110 in the system environment 100 have different amounts of processing power (e.g., due to differences in their hardware). For example, one of the client devices 110 may have less processing power than another client device 110 because the latter has more available CPU power than the former.

The client devices 110 also are capable of transmitting and receiving data via the network 120 or via any other suitable means (e.g., via radio waves over a Bluetooth connection between the client devices 110). In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 may be configured to communicate via the network 120. In one embodiment, a client device 110 executes an application 130 (e.g., a video chat application 130) allowing the client device 110 to interact with a different client device 110. For example, a client device 110 executes a video chat application 130 to enable communication between a user of the client device 110 and a user of another client device 110 via the network 120. In another embodiment, a client device 110 executes an application 130 allowing the client device 110 to interact with another client device 110 using a video communication service or feature provided by an online system 140 (e.g., a social networking system). For example, a client device 110 executes a browser application 130 to enable communication between a user of the client device 110 and a user of another client device 110 via the network 120 using a live video streaming feature of an online system 140. In yet another embodiment, a client device 110 enables interaction between the client device 110 and another client device 110 using a video communication service or feature provided by an online system 140 through an application programming interface (API) running on a native operating system of the client device 110, such as IOS® or ANDROID™.

The client devices 110 may be configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more applications 130 (e.g., video chat applications 130) running on one or more client devices 110 may be coupled to the network 120, allowing the client devices 110 to communicate with each other. Examples of applications 130 include browser applications 130, social networking applications 130, video chat applications 130, or any other suitable types of applications 130 capable of running on a client device 110 that allows the client device 110 to transmit and receive various types of data (e.g., processed and/or unprocessed video data, processed and/or unprocessed audio data, and metadata associated with video data and/or audio data).

One or more online systems 140 being accessed by one or more client devices 110 also may be coupled to the network 120, allowing the client devices 110 to communicate with each other. The online system(s) 140 may include any type of online system 140 that provides a video communication service or feature. For example, a social networking system that provides a video chat service may allow client devices 110 accessing the social networking system to communicate with each other.

Figure 2:
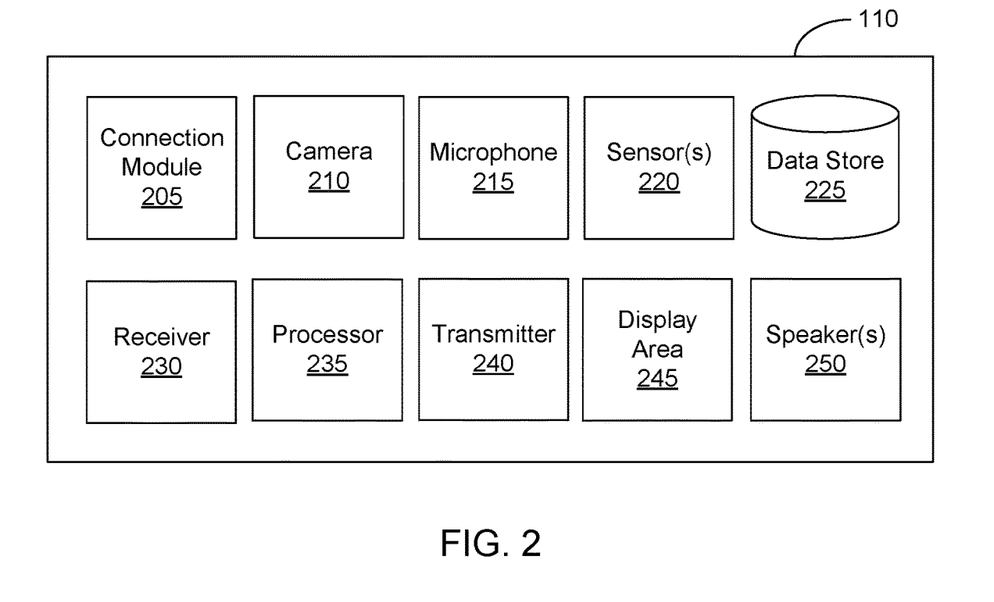
FIG. 2 is a block diagram of a client device, in accordance with an embodiment.

FIG. 2 is a block diagram of an architecture of a client device 110. The client device 110 shown in FIG. 2 includes a connection module 205, a camera 210, a microphone 215, one or more sensors 220, a data store 225, a receiver 230, a processor 235, a transmitter 240, a display area 245, and one or more speakers 250. In other embodiments, the client device 110 may include additional, fewer, or different components for various applications. Conventional components of client devices 110 such as software, storage devices, memory, and the like are not shown so as to not obscure the details of the system architecture.

Each client device 110 includes a connection module 205 that allows a connection to be established (e.g., as shown in step 305 of FIGS. 3A and 3B) at the client device 110 to one or more other client devices 110. Examples of types of connections that may be established between two or more client devices 110 include Wi-Fi connections, Bluetooth connections, VoIP connections, etc. Once a connection is established at a client device 110 to another client device 110, the client devices 110 may communicate various types of data to each other (e.g., processed and/or unprocessed video data, processed and/or unprocessed audio data, and metadata associated with video data and/or audio data). For example, suppose that a connection is established at a first client device 110 to a second client device 110. In this example, the first client device 110 may communicate video data and metadata associated with the video data and/or audio data and metadata associated with the audio data to the second client device 110. Continuing with this example, the second client device 110 may communicate processed video data and/or processed audio data to the first client device 110. The functionality of the connection module 205 is further described below in conjunction with FIGS. 3A and 3B.

The camera 210 of a client device 110 captures (e.g., as shown in step 310 of FIGS. 3A and 3B) video data associated with a user of the client device 110 while the client device 110 is in use. For example, the camera 210 of a client device 110 may capture multiple frames of video data associated with a user of the client device 110, in which each frame includes an image of the user during a video call. In some embodiments, the camera 210 of a client device 110 may include components and/or may communicate with other components of the client device 110, in which the components are capable of receiving various types of data associated with video data captured by the camera 210. For example, the camera 210 of a client device 110 may include a GPS receiver or may communicate with one or more sensors 220 (described below) of the client device 110. As an additional example, the camera 210 of a client device 110 may include components having various types of functionality (e.g., motion detection, light detection, face tracking, facial recognition, etc.).

The camera 210 of a client device 110 also may capture (e.g., as shown in step 320 of FIGS. 3A and 3B) metadata associated with video data captured by the camera 210. Examples of metadata associated with video data include a date and a time describing when the video data were captured (e.g., a timestamp), a time zone associated with a geographic location at which the video data were captured, a type of client device 110 and/or software used to capture the video data, information describing positions of pixels of one or more frames (e.g., pixel coordinates) included among the video data, information that describes a measurement associated with a color of each of one or more pixels of one or more frames included among the video data (e.g., RGB values), etc. In embodiments in which the camera 210 of a client device 110 includes components and/or communicates with other components of the client device 110, in which the components are capable of receiving various types of data associated with video data captured by the camera 210, metadata associated with the video data also may be captured by these components. For example, metadata associated with video data may include GPS coordinates associated with a geographic location at which the video data were captured, information describing a motion of a client device 110 used to capture the video data, information describing lighting conditions used when capturing the video data, etc. As an additional example, if components of a camera 210 provide functionalities including facial recognition, metadata associated with video data captured by the camera 210 may include information identifying one or more individuals whose faces are recognized, as well as locations (e.g., pixel coordinates) and times (e.g., timestamps) at which the faces are detected in the video data. The functionality of the camera 210 is further described below in conjunction with FIGS. 3A and 3B.

The microphone 215 of a client device 110 may capture (e.g., as shown in step 310 of FIGS. 3A and 3B) audio data associated with a user of the client device 110 while the client device 110 is in use (e.g., during a video call). Examples of types of audio data that may be captured by the microphone 215 of a client device 110 include sound waves corresponding to audio data (e.g., dialogue) to be communicated to a different client device 110 to which the client device 110 is connected or voice commands received from a user of the client device 110 to turn on the client device 110 or to initiate a video call. In some embodiments, the microphone 215 of a client device 110 may have various components and/or may communicate with other components of the client device 110, in which the components are configured to detect certain types of noises. For example, the microphone 215 of a client device 110 may communicate with one or more sensors 220 (described below) of the client device 110 that are capable of detecting ambient noises, echos, and reverberations.

The microphone 215 of a client device 110 also may capture (e.g., as shown in step 320 of FIGS. 3A and 3B) metadata associated with audio data captured by the microphone 215. Examples of metadata associated with audio data include a date and a time describing when the audio data were captured (e.g., a timestamp), a time zone associated with a geographic location at which the audio data were captured, a type of client device 110 and/or software used to capture the audio data, frequencies and amplitudes of various sound waves included among the audio data, etc. In embodiments in which the microphone 215 of a client device 110 has components and/or communicates with other components of the client device 110, in which the components are configured to detect certain types of noises, metadata associated with audio data captured by the microphone 215 may indicate that sound waves corresponding to these types of noises have particular frequencies and amplitudes. For example, suppose that components of the microphone 215 at a client device 110 are configured to detect ambient noises. In this example, metadata associated with audio data captured by the microphone 215 may indicate that sound waves corresponding to certain noises (e.g., noise from traffic, noise from an air conditioner, etc.) that have particular frequencies and amplitudes are ambient noises. The functionality of the microphone 215 is further described below in conjunction with FIGS. 3A and 3B.

In some embodiments, a client device 110 may include one or more types of sensors 220. In such embodiments, the sensor(s) 220 may capture (e.g., as shown in step 320 of FIGS. 3A and 3B) metadata associated with video data and/or audio data. Examples of types of sensors 220 include light sensors 220, accelerometers, motion sensors 220, gyroscopes, ambient noise sensors 220, etc. As described above, in embodiments in which a client device 110 includes one or more types of sensors 220, metadata associated with video data captured by the camera 210 of the client device 110 may include various types of information received by the sensor(s) 220, such as GPS coordinates associated with a geographic location at which the video data were captured, information describing a motion of the client device 110 while capturing the video data, information describing lighting conditions used when capturing the video data, etc. As also described above, in embodiments in which a client device 110 includes one or more types of sensors 220, metadata associated with audio data captured by the microphone 215 of the client device 110 may include various types of information captured by the sensor(s) 220, such as frequencies and amplitudes of types of noises detected by the sensor(s) 220. The functionality of the sensor(s) 220 is further described below in conjunction with FIGS. 3A and 3B.

Various types of data (e.g., processed and/or unprocessed video data, processed and/or unprocessed audio data, and metadata associated with video data and/or audio data) may be stored in the data store 225. In some embodiments, video data and metadata associated with the video data and/or audio data and metadata associated with the audio data are stored in the data store 225 before being processed or transmitted to another client device 110. For example, as video data and metadata associated with the video data and/or audio data and metadata associated with the audio data are captured and/or received at a client device 110, the data and metadata may be stored in the data store 225. In this example, the data and metadata may be retrieved from the data store 225 and processed by the processor 235 (described below) or transmitted to another client device 110 by the transmitter 240 (described below). In various embodiments, processed video data and/or processed audio data also may be stored in the data store 225 before the processed video data and/or processed audio data are transmitted to another client device 110 or displayed and/or played. In the above example, as the video data and/or the audio data are being processed by the processor 235, the processed video data and/or processed audio data may be stored in the data store 225. In this example, the processed video data and/or the processed audio data may be retrieved from the data store 225 and transmitted to another client device 110 by the transmitter 240 or displayed at a display area 245 (described below) and/or played at one or more speakers 250 (described below). The data store 225 is further described below in conjunction with FIGS. 3A and 3B.

The receiver 230 allows a client device 110 to receive (e.g., as shown in step 315 of FIG. 3A) video data and/or audio data from a different client device 110. The receiver 230 also allows a client device 110 to receive (e.g., as shown in step 325 of FIG. 3A) metadata associated with video data and/or metadata associated with audio data from a different client device 110. The receiver 230 receives video data and metadata associated with the video data and/or audio data and metadata associated with the audio data via a connection established between a client device 110 at which the receiver 230 is located and another client device 110. In some embodiments, the receiver 230 may store video data and metadata associated with the video data and/or audio data and metadata associated with the audio data it receives in the data store 225. In such embodiments, the receiver 230 may store the data and metadata in association with various types of information. For example, the receiver 230 may store video data and metadata associated with the video data and/or audio data and metadata associated with the audio data in the data store 225 in association with information identifying a type of connection (e.g., Bluetooth, Wi-Fi, etc.) between a client device 110 at which the receiver 230 is located and another client device 110.

In some embodiments, the receiver 230 also allows a client device 110 to receive processed video data and/or processed audio data from a different client device 110. In such embodiments, the receiver 230 may receive the processed video data and/or the processed audio data via a connection established between the client devices 110. For example, the receiver 230 at a first client device 110 receives processed video data and/or processed audio data as the video data and/or the audio data are being processed by a processor 235 (described below) at a second client device 110 to which the first client device 110 is connected. In this example, the receiver 230 at the first client device 110 may store the processed video data and/or the processed audio data in the data store 225. Alternatively, in the above example, the receiver 230 may send the processed video data for display in a display area 245 (described below) of the first client device 110 and/or send the processed audio data to be played by one or more speakers 250 (described below) of the first client device 110. The functionality of the receiver 230 is further described below in conjunction with FIGS. 3A and 3B.

The processor 235 processes (e.g., as shown in step 330 of FIGS. 3A and 3B) video data based on metadata associated with the video data and/or audio data based on metadata associated with the audio data, thereby enhancing a quality of the video data and/or the audio data. The processor 235 may process video data and/or audio data based on metadata associated with the video data and/or the audio data while a client device 110 at which the processor 235 is located is connected to another client device 110 (e.g., during a video call between the client devices 110). Examples of ways in which the quality of video data may be enhanced include stabilizing images in the video data, correcting one or more colors in the video data, reducing background motion of the video data, enhancing a resolution of the video data, etc., while examples of ways in which the quality of audio data may be enhanced include reducing or cancelling background noise, echo, reverberation, etc.

In some embodiments, by processing video data based on metadata associated with the video data, the processor 235 may enhance the quality of the video data via image stabilization. Image stabilization may be desirable to counteract an effect of a movement of a client device 110 that captured video data on the video data itself. For example, image stabilization may be used to reduce the blurriness of images included among video data due to shaking of the client device 110 used to capture the video data. The processor 235 may determine a motion of a client device 110 that captured video data based on information included among metadata associated with the video data that describes the motion. The processor 235 may then stabilize one or more images included among the video data using various techniques or algorithms (e.g., zooming, re-centering, cropping, video-stabilization algorithms, etc.). For example, if one or more sensors 220 (e.g., gyroscopes or accelerometers) at a client device 110 detect a motion of the client device 110 (e.g., an acceleration or an angular velocity of the client device 110 in a vertical and/or a horizontal direction) as the client device 110 captures video data, metadata associated with the video data may describe this motion. In this example, when the processor 235 of the same or a different client device 110 receives the video data and the metadata, the processor 235 may determine the motion of the client device 110 that captured the video data (e.g., the direction and amount of motion) based on information included among the metadata. Continuing with this example, based on the motion, the processor 235 may stabilize an image included among the video data by zooming in to consecutive frames included among the video data that include the image, re-centering the frames, and cropping portions of the frames to counteract the motion. Alternatively, in the above example, the processor 235 may stabilize the image using a video-stabilization algorithm that compares the consecutive frames included among the video data that include the image and warps the image within the frames so that its features appear in the same locations within the frames.

In some embodiments, by processing video data based on metadata associated with the video data, the processor 235 also may enhance the quality of the video data via color correction. Color correction may be desirable to correct for any differences between the rendering of colors by different client devices 110. The processor 235 may correct one or more colors in video data by identifying information included among metadata associated with the video data that describes a measurement associated with a color of each of one or more pixels included among the video data. For each pixel, the processor 235 then determines a measurement associated with the color of the pixel if it were rendered at a client device 110 (i.e., at the client device 110 at which the processor 235 is located or at a different client device 110). The processor 235 may then determine a difference between the measurements associated with each pixel and modify the color of the pixel based on the difference so that its color matches the color described by the measurement included among the metadata when the pixel is rendered at the client device 110. For example, the processor 235 may identify information included among metadata describing amounts of red, green, and blue (RGB values) representing a color of a pixel in a particular location of a frame included among video data. In this example, the processor 235 may determine RGB values of the pixel if the pixel were rendered at a client device 110. Continuing with this example, the processor 235 may determine a difference between the colors (e.g., by determining a Euclidean distance between the colors based on the RGB values). In the above example, the processor 235 may modify the color of the pixel based on the difference, such that the color of the pixel rendered at the client device 110 matches the color of the pixel described by the metadata.

In various embodiments, by processing video data based on metadata associated with the video data, the processor 235 also may enhance the quality of the video data by reducing background motion of the video data (e.g., by blurring the background). Reducing background motion of video data may be desirable for various reasons. For example, to make video data appear smoother, background motion of the video data may be reduced if the video data are captured using a mobile device and are to be displayed at a client device 110 that is stationary (e.g., a desktop computer) or in a display area 245 (described below) that is at least a threshold size. As an additional example, background motion of video data may be reduced to focus a viewer's attention on the foreground of the video data.

The processor 235 may reduce background motion of video data using various techniques, such as segmentation, background detection, or any other suitable techniques. For example, the processor 235 may partition each of one or more frames included among video data into multiple segments (e.g., via model-based segmentation, watershed transformation, etc.) based on information included among metadata associated with the video data that describes positions of pixels of the frame(s)). In this example, the processor 235 may then identify the background of the frame(s) corresponding to a set of the segments using various techniques (e.g., using background detection or modeling techniques). Continuing with this example, the processor 235 may detect background motion within the video data (e.g., by comparing pixels of the background in consecutive frames included among the video data). In the above example, the processor 235 may blur the segments corresponding to the background (e.g., via Gaussian blur). In embodiments in which the processor 235 reduces background motion of video data by blurring the background, the amount by which the background is blurred may be proportional to the background motion that is detected. For example, if the background is blurred using Gaussian blur, the standard deviation of the Gaussian distribution used to calculate the transformation to apply to each pixel of the background may be proportional to the amount of background motion that is detected.

In some embodiments, by processing video data based on metadata associated with the video data, the processor 235 also may enhance the quality of the video data by enhancing the resolution of the video data. Enhancing the resolution of video data may be desirable if the video data are to be displayed in a display area 245 (described below) of a client device 110 having a higher resolution than the resolution of the camera 210 of the client device 110 used to capture the video data. The processor 235 may first determine whether to enhance the resolution of video data based on information included among metadata associated with the video data that describes a context in which the video data were captured. Examples of such information include a resolution of the video data, a type of client device 110 and/or software used to capture the video data, lighting conditions used when capturing the video data, etc. If the processor 235 determines that the resolution of the video data should be enhanced, the processor 235 may do so using various techniques. For example, if the processor 235 determines that information included among metadata associated with video data that describes a context in which the video data were captured indicates that a resolution of the video data is lower than that of a display area 245 (described below) of a client device 110 at which the video data are to be displayed, the processor 235 may enhance the resolution of the video data using a super-resolution technique that upsamples pixels included among the video data.

In some embodiments, by processing audio data based on metadata associated with the audio data, the processor 235 may enhance the quality of the audio data by identifying various types of noises (e.g., background noises, echos, reverberations, etc.) included among the audio data based on information included among the metadata associated with the audio data that describes the noises. In such embodiments, the processor 235 may then process the audio data to enhance the quality of the audio data (e.g., using noise-cancelling technology, dereverberation, echo cancellation, etc.). For example, suppose that the microphone 215 at a client device 110 captures ambient noises. In this example, metadata associated with audio data captured by the microphone 215 may indicate that sound waves corresponding to certain noises (e.g., noise from wind, noise from a lawn mower, etc.) that have particular frequencies and amplitudes are ambient noises. In this example, when the processor 235 of the same or a different client device 110 receives the audio data and the metadata, the processor 235 may generate a new sound wave that is 180 degrees out-of-phase with each sound wave corresponding to an ambient noise. Continuing with this example, the new sound waves may be played in conjunction with the audio data at a client device 110 to cancel out the ambient noises. The functionality of the processor 235 is further described below in conjunction with FIGS. 3A-3B and 4A-4E.

The transmitter 240 allows a client device 110 to transmit (e.g., as shown in step 333 of FIG. 3B) processed video data and/or processed audio data from a client device 110 at which the transmitter 240 is located to a different client device 110. The transmitter 240 transmits processed video data and/or processed audio data via a connection established between a client device 110 at which the transmitter 240 is located and another client device 110. In some embodiments, the transmitter 240 may retrieve processed video data and/or processed audio data from the data store 225. In such embodiments, the transmitter 240 may transmit the processed video data and/or processed audio data based on various types of information stored in association with the processed video data and/or the processed audio data in the data store 225 (e.g., information identifying a type of connection (e.g., Bluetooth, Wi-Fi, etc.) between a client device 110 at which the transmitter 240 is located and another client device 110, etc.).

In some embodiments, the transmitter 240 also allows a client device 110 to transmit video data and metadata associated with the video data and/or audio data and metadata associated with the audio data from a client device 110 at which the transmitter 240 is located to a different client device 110. For example, as video data and metadata associated with the video data and/or audio data and metadata associated with the audio data are being captured by the camera 210 and/or by the microphone 215 at a client device 110, the data and metadata may be stored in the data store 225. In this example, the transmitter 240 may then retrieve the data and metadata from the data store 225 and transmit the data and metadata to a different client device 110 to which the client device 110 is connected.

The transmitter 240 may transmit data from a client device 110 at which the transmitter 240 is located to a different client device 110 based on a type of connection between the client devices 110. For example, if two client devices 110 are connected via a Bluetooth connection, the transmitters 240 on both client devices 110 may transmit data to the other client device 110 via radio waves. The functionality of the transmitter 240 is further described below in conjunction with FIGS. 3A and 3B.

Components of a client device 110 also may include a display area 245 (e.g., an LCD screen, a touchscreen, etc.), which may display (e.g., as shown in step 335 of FIGS. 3A and 3B) processed video data at the client device 110. For example, the display area 245 of a client device 110 may display video data that has been processed to enhance the resolution of the video data and to correct one or more colors in the video data. The display area 245 of a client device 110 may display processed video data as it is received at the receiver 230 of a client device 110 or as it is processed by the processor 235 of the client device 110. Alternatively, the display area 245 of a client device 110 may display processed video data that is stored in the data store 225. The display area 245 of a client device 110 may have a particular size and resolution. For example, a client device 110 may have a display area 245 that is 4.7 inches and has a resolution of 1334×750 or 326 ppi while a different client device 110 may have a display area 245 that is 5.8 inches and has a resolution of 2436×1125 or 458 ppi.

The display area 245 of a client device 110 also may allow a user of the client device 110 at which the display area 245 is located to select various options associated with the client device 110 (e.g., to select a contact from a list of contacts, to initiate or receive a video call, etc.) and/or to view a video, an image, etc. For example, a user of a client device 110 may access a list of contacts via a display area 245 of the client device 110 (e.g., a touchscreen) and request to initiate a video call by selecting a contact included in the list. In this example, once the call is initiated, the display area 245 may display a live video feed of an individual to whom the video call was made, as well as a window that displays a live video feed of the user who initiated the call being captured by the camera 210. The functionality of the display area 245 is further described below in conjunction with FIGS. 3A and 3B.

One or more speakers 250 of a client device 110 may play (e.g., as shown in step 335 of FIGS. 3A and 3B) processed audio data at the client device 110. For example, if audio data has been processed in a way that cancels a background noise in the audio data by generating a new sound wave that is 180 degrees out-of-phase with a sound wave corresponding to the background noise, the new sound wave may be played in conjunction with the audio data at one or more speakers 250 of a client device 110 to cancel out the background noise. The speaker(s) 250 of a client device 110 may play processed audio data as it is received at the receiver 230 of the client device 110 or as it is processed by the processor 235 of the client device 110. Alternatively, the speaker(s) 250 of a client device 110 may play processed audio data that is stored in the data store 225.

In some embodiments, the speaker(s) 250 of a client device 110 also may output additional types of audio data. For example, the speaker 250 of a client device 110 may output an automated response confirming receipt of instructions from a user of the client device 110. As an additional example, if a client device 110 allows a user of the client device 110 to stream movies or music, the speaker(s) 250 of the client device 110 may output audio data associated with the movies or music. The functionality of the speaker(s) 250 is further described below in conjunction with FIGS. 3A and 3B.

Figure 3A:
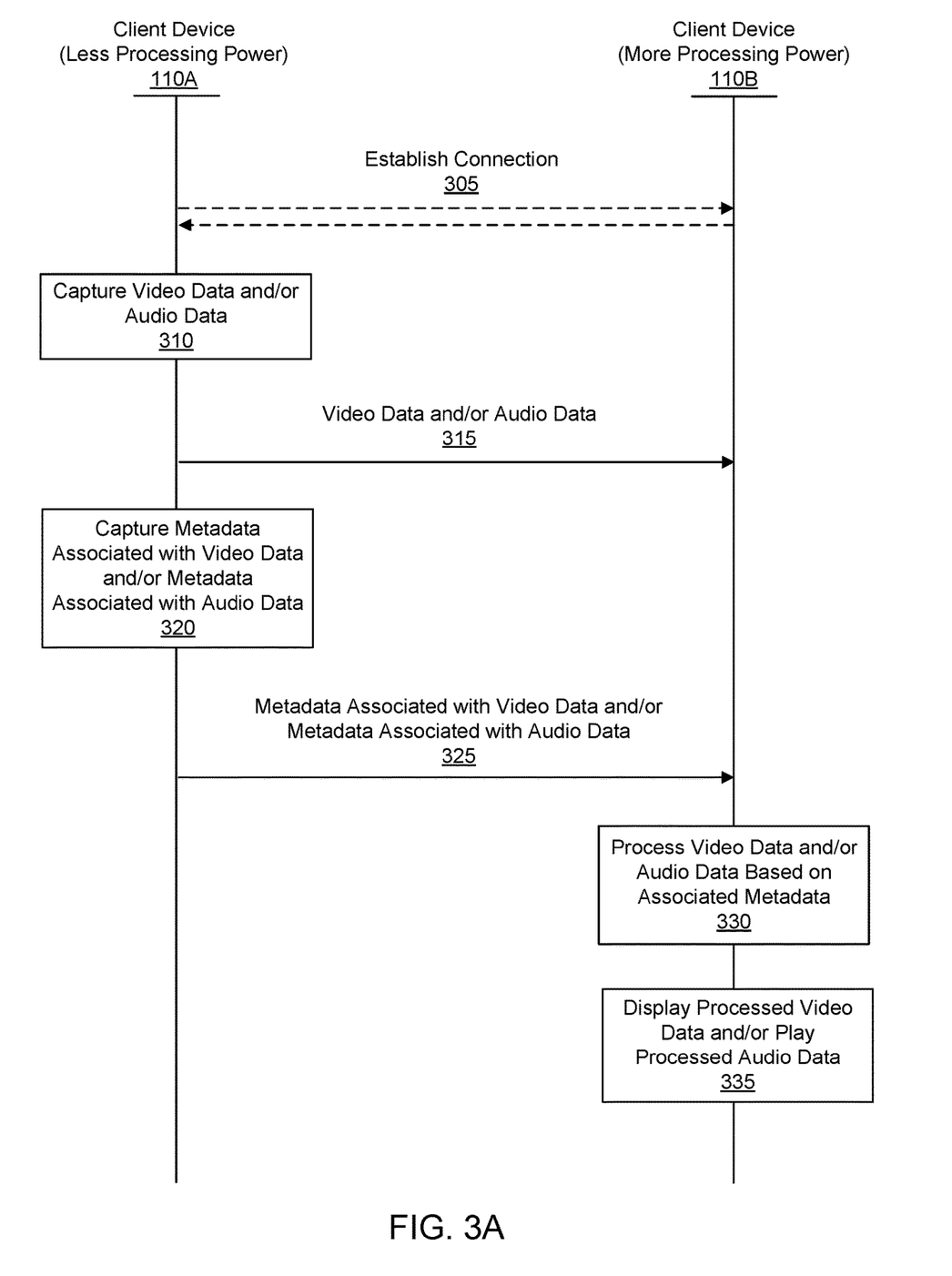
FIG. 3A is an interaction diagram of a method for enhancing a quality of video data based on metadata at a client device having more processing power in a system of client devices having different amounts of processing power, in accordance with an embodiment.
Figure 3B:
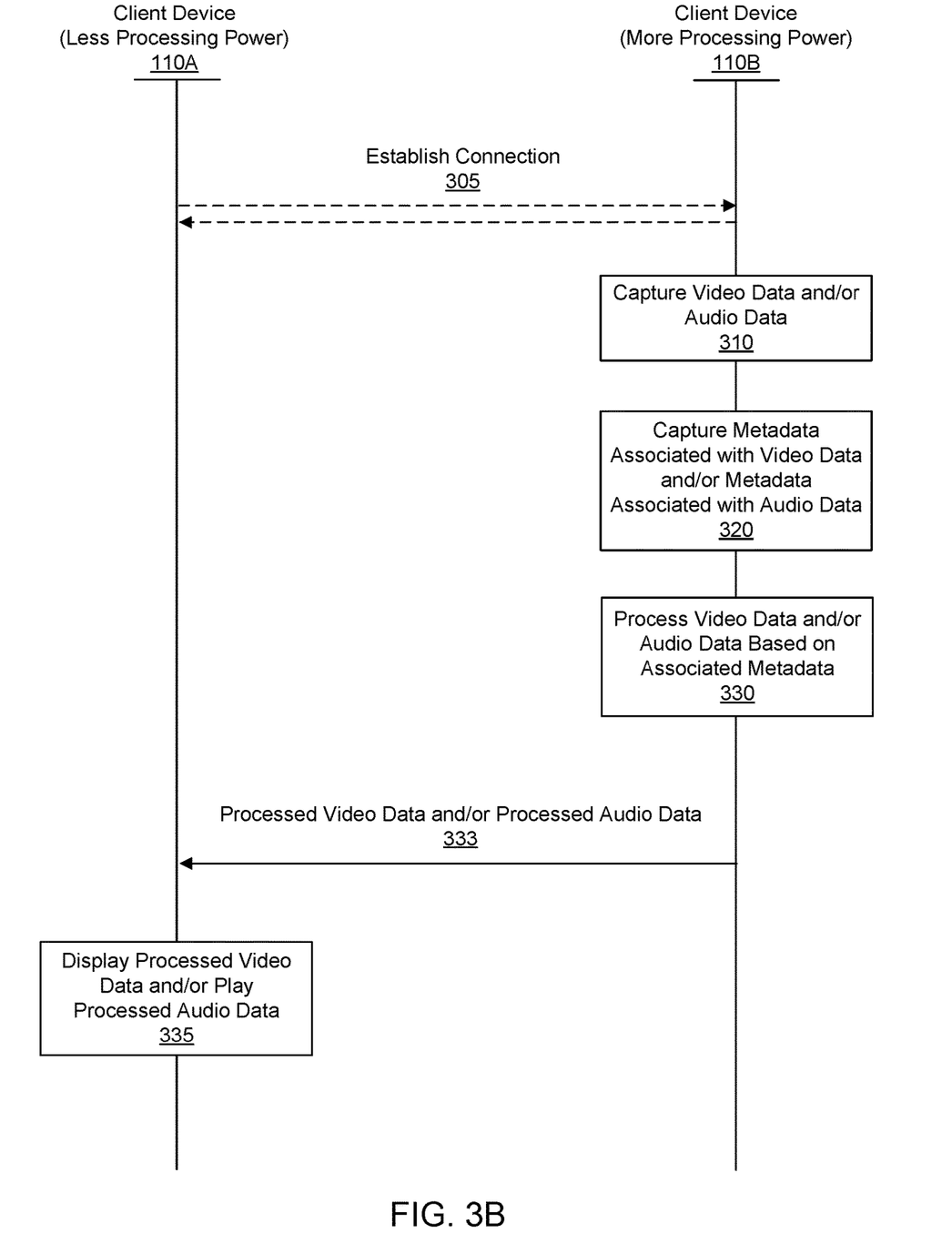
FIG. 3B is an interaction diagram of an additional method for enhancing a quality of video data based on metadata at a client device having more processing power in a system of client devices having different amounts of processing power, in accordance with an embodiment.

Enhancing a Quality of Video Data Based on Metadata at a Client Device Having More Processing Power in a System of Client Devices Having Different Amounts of Processing Power FIG. 3A is an interaction diagram of a method for enhancing a quality of video data based on metadata at a client device having more processing power in a system of client devices having different amounts of processing power, while FIG. 3B is an interaction diagram of an additional method for enhancing a quality of video data based on metadata at a client device having more processing power in a system of client devices having different amounts of processing power. In other embodiments, the method may include different and/or additional steps than those shown in FIGS. 3A and 3B. Additionally, steps of the method may be performed in a different order than the order described in conjunction with FIGS. 3A and 3B.

Referring first to FIG. 3A, in a system including multiple client devices 110 that are capable of capturing and displaying video data and/or audio data, at least two of the client devices 110A-B have different amounts of processing power (e.g., due to differences in their hardware). A connection is established 305 (e.g., using the connection module 205) at the client device 110B having more processing power to the client device 110A having less processing power. For example, the client device 110B having more processing power communicates a request to establish 305 a connection to make a video call to the client device 110A having less processing power. Alternatively, in the above example, the client device 110A having less processing power may communicate a request to establish 305 a connection to make a video call to the client device 110B having more processing power. As described above, examples of types of connections that may be established 305 between the client devices 110A-B include Wi-Fi connections, Bluetooth connections, VoIP connections, etc.

Once the connection is established 305, the client device 110A having less processing power captures 310 (e.g., using the camera 210) video data associated with a user of the client device 110A having less processing power. For example, the client device 110A having less processing power captures 310 multiple frames of images of the user of the client device 110A. The client device 110A having less processing power also may capture 310 (e.g., using the microphone 215) audio data associated with the user of the client device 110A having less processing power. For example, the client device 110A having less processing power captures (in step 310) sound waves corresponding to dialogue or other types of audio data to be communicated to a user of the client device 110B having more processing power. The client device 110B having more processing power then receives 315 (e.g., using the receiver 230) the video data and/or the audio data from the client device 110A having less processing power via the connection between the client devices 110A-B.

The client device 110A having less processing power also captures 320 (e.g., using the camera 210 and one or more sensors 220) metadata associated with the video data. For example, the client device 110A having less processing power captures 320 metadata associated with the video data including information describing positions of pixels of one or more frames (e.g., pixel coordinates) included among the video data, information that describes a measurement associated with a color of each of one or more pixels of one or more frames included among the video data (e.g., RGB values), information describing a motion of the client device 110A having less processing power while capturing 310 the video data, etc. The client device 110A having less processing power also may capture 320 (e.g., using the microphone 215 and one or more sensors 220) metadata associated with the audio data. For example, the client device 110A having less processing power may capture (in step 320) information indicating that certain sound waves that have particular frequencies and amplitudes correspond to certain noises (e.g., ambient noises, echo, reverberation, etc.).

The client device 110B having more processing power then receives 325 (e.g., using the receiver 230) metadata associated with the video data and/or metadata associated with the audio data from the client device 110A having less processing power via the connection between the client devices 110A-B. In some embodiments, the client device 110B having more processing power may store the video data and metadata associated with the video data and/or the audio data and metadata associated with the audio data (e.g., in the data store 225) in association with various types of information (e.g., information identifying a type of connection (e.g., Bluetooth, Wi-Fi, etc.) between the client devices 110A-B).

The client device 110B having more processing power processes 330 (e.g., using the processor 235) the video data based on the metadata associated with the video data and/or the audio data based on the metadata associated with the audio data, thereby enhancing a quality of the video data and/or the audio data while the client devices 110A-B are connected (e.g., during a video call between the client devices 110A-B). Examples of ways in which the quality of the video data may be enhanced include stabilizing images in the video data, correcting one or more colors in the video data, reducing background motion of the video data, enhancing a resolution of the video data, etc., while examples of ways in which the quality of the audio data may be enhanced include reducing or cancelling background noise, echo, reverberation, etc.

In embodiments in which the client device 110B having more processing power enhances the quality of the video data via image stabilization, the client device 110B having more processing power may determine a motion of the client device 110A having less processing power based on information included among the metadata associated with the video data that describes the motion. The client device 110B having more processing power may then stabilize one or more images included among the video data using various techniques or algorithms (e.g., zooming, re-centering, cropping, video-stabilization algorithms, etc.).

Figure 4A:
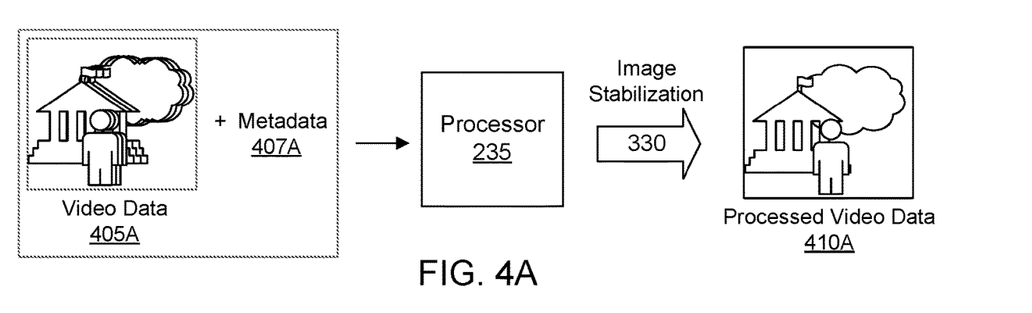
FIG. 4A is an example of enhancing a quality of video data based on metadata, in accordance with an embodiment.

As shown in the example of FIG. 4A, if a motion of the client device 110A having less processing power was detected (e.g., using one or more sensors 220) as the client device 110A captured 310 the video data 405A, the metadata 407A associated with the video data 405A may describe this motion. In this example, when the client device 110B having more processing power receives 315, 325 the video data 405A and the metadata 407A associated with the video data 405A, the client device 110B having more processing power may process 330 the video data 405A by determining the motion of the client device 110A having less processing power (e.g., the direction and amount of motion) based on information included among the metadata 407A, such that one or more images included among the processed video data 410A is stabilized. In the above example, the client device 110B having more processing power may process 330 the video data 405A by zooming in to consecutive frames included among the video data 405A that include the image(s), re-centering the frames, and cropping portions of the frames to counteract the motion, by using a video-stabilization algorithm, etc.

In embodiments in which the client device 110B having more processing power enhances the quality of the video data via color correction, the client device 110B having more processing power may identify information included among the metadata associated with the video data that describes a measurement associated with a color of each of one or more pixels included among the video data. For each pixel, the client device 110B having more processing power then determines a measurement associated with the color of the pixel if it were rendered at the client device 110B having more processing power. The client device 110B having more processing power may then determine a difference between the measurements associated with each pixel and modify the color of the pixel based on the difference so that its color matches the color described by the measurement included among the metadata when the pixel is rendered at the client device 110 B having more processing power.

Figure 4B:
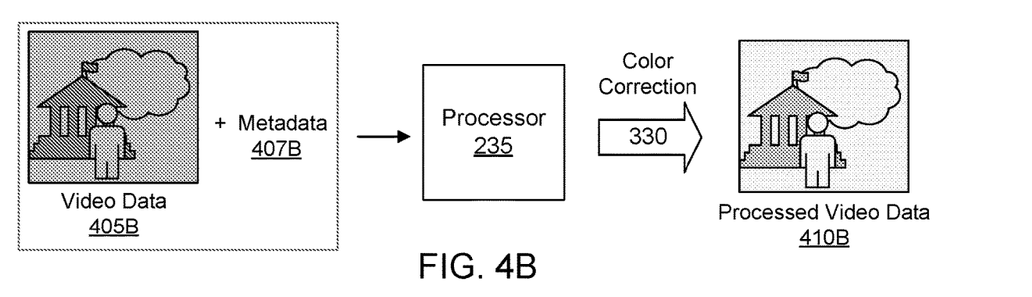
FIG. 4B is an additional example of enhancing a quality of video data based on metadata, in accordance with an embodiment.

As shown in the example of FIG. 4B, the client device 110B having more processing power may identify information included among the metadata 407B associated with the video data 405B describing amounts of red, green, and blue (RGB values) representing a color of a pixel in a particular location of a frame included among the video data 405B. In this example, the client device 110B having more processing power may determine RGB values of the pixel if the pixel were rendered at the client device 110B having more processing power. Continuing with this example, the client device 110B having more processing power may determine a difference between the colors (e.g., by determining a Euclidean distance between the colors based on the RGB values). In the above example, the client device 110B having more processing power may modify the color of the pixel based on the difference, such that in the processed video data 410B, the color of the pixel rendered at the client device 110B having more processing power matches the color of the pixel described by the metadata 407B.

In embodiments in which the client device 110B having more processing power enhances the quality of the video data by reducing background motion of the video data, the client device 110B having more processing power may do so using various techniques, such as segmentation, background detection, or any other suitable techniques. In some embodiments, the client device 110B having more processing power may reduce background motion of the video data by blurring the background. For example, the background of the video data may be blurred to make the video data appear smoother if the client device 110A having less processing power that captured 310 the video data is a mobile device and if the client device 110B having more processing power at which the video data are to be displayed is stationary or has a display area 245 that is at least a threshold size.

Figure 4C:
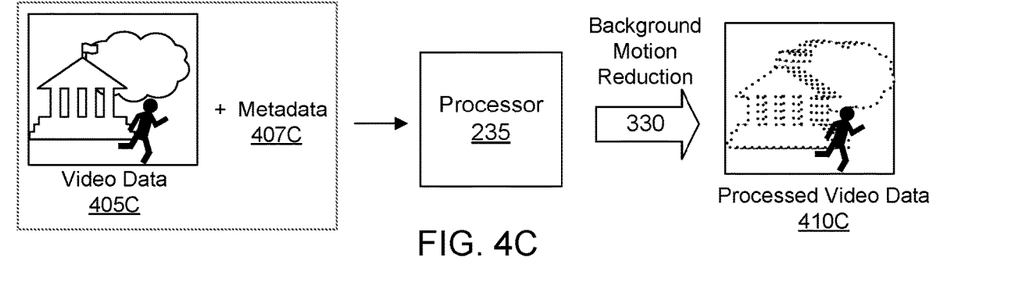
FIG. 4C is an additional example of enhancing a quality of video data based on metadata, in accordance with an embodiment.

As shown in the example of FIG. 4C, the client device 110B having more processing power may partition each of one or more frames included among the video data 405C into multiple segments (e.g., via model-based segmentation, watershed transformation, etc.) based on information included among the metadata 407C associated with the video data 405C that describes positions of pixels of the frame(s)). In this example, the client device 110B having more processing power may then identify the background of the frame(s) corresponding to a set of the segments using various techniques (e.g., using background detection or modeling techniques). Continuing with this example, the client device 110B having more processing power may detect background motion within the video data 405C (e.g., by comparing pixels of the background in consecutive frames included among the video data 405C). In the above example, the client device 110B having more processing power may blur the segments corresponding to the background (e.g., via Gaussian blur), such that the background of the processed video data 410C is blurred. In embodiments in which the client device 110B having more processing power reduces background motion of the video data 405C by blurring the background, the amount by which the background is blurred may be proportional to the background motion that is detected. For example, if the background is blurred using Gaussian blur, the standard deviation of the Gaussian distribution used to calculate the transformation to apply to each pixel of the background may be proportional to the amount of background motion that is detected.

In embodiments in which the client device 110B having more processing power enhances the quality of the video data by enhancing the resolution of the video data, the client device 110B having more processing power may first determine whether to enhance the resolution of the video data based on information included among the metadata associated with the video data that describes a context in which the video data were captured 310. Examples of such information include a resolution of the video data, a type of client device 110 and/or software used to capture 310 the video data, lighting conditions used when capturing 310 the video data, etc. If the client device 110B having more processing power determines that the resolution of the video data should be enhanced, the client device 110B having more processing power may do so using various techniques.

Figure 4D:
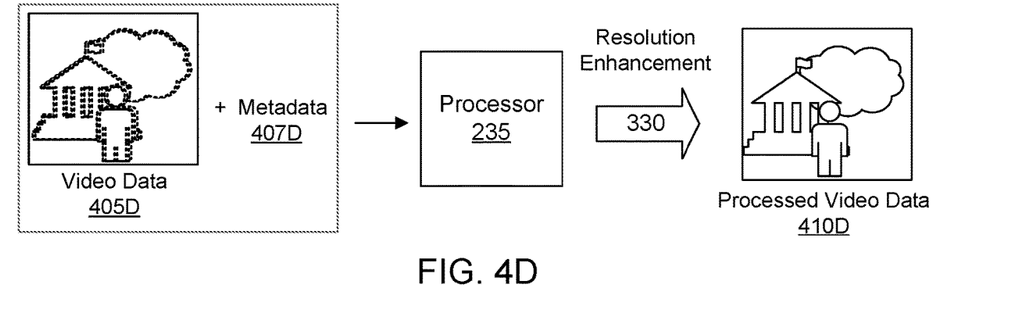
FIG. 4D is an additional example of enhancing a quality of video data based on metadata, in accordance with an embodiment.

As shown in the example of FIG. 4D, suppose that the client device 110B having more processing power determines that information included among the metadata 407D associated with the video data 405D that describes a context in which the video data 405D were captured 310 indicates that a resolution of the video data 405D is lower than that of a display area 245 of the client device 110B having more processing power. In this example, the client device 110B having more processing power may process 330 the video data 405D using a super-resolution technique that upsamples pixels included among the video data 405D, such that the processed video data 410D have a resolution that is enhanced.

In some embodiments, by processing 330 the audio data based on the metadata associated with the audio data, the client device 110B having more processing power may enhance the quality of the audio data by identifying various types of noises (e.g., background noises, echos, reverberations, etc.) included among the audio data. The client device 110B having more processing power may do so based on information included among the metadata associated with the audio data that describes the noises. The client device 110B having more processing power may then process 330 the audio data to enhance the quality of the audio data (e.g., by reducing or eliminating the background noises, echos, reverberations, etc.).

Figure 4E:
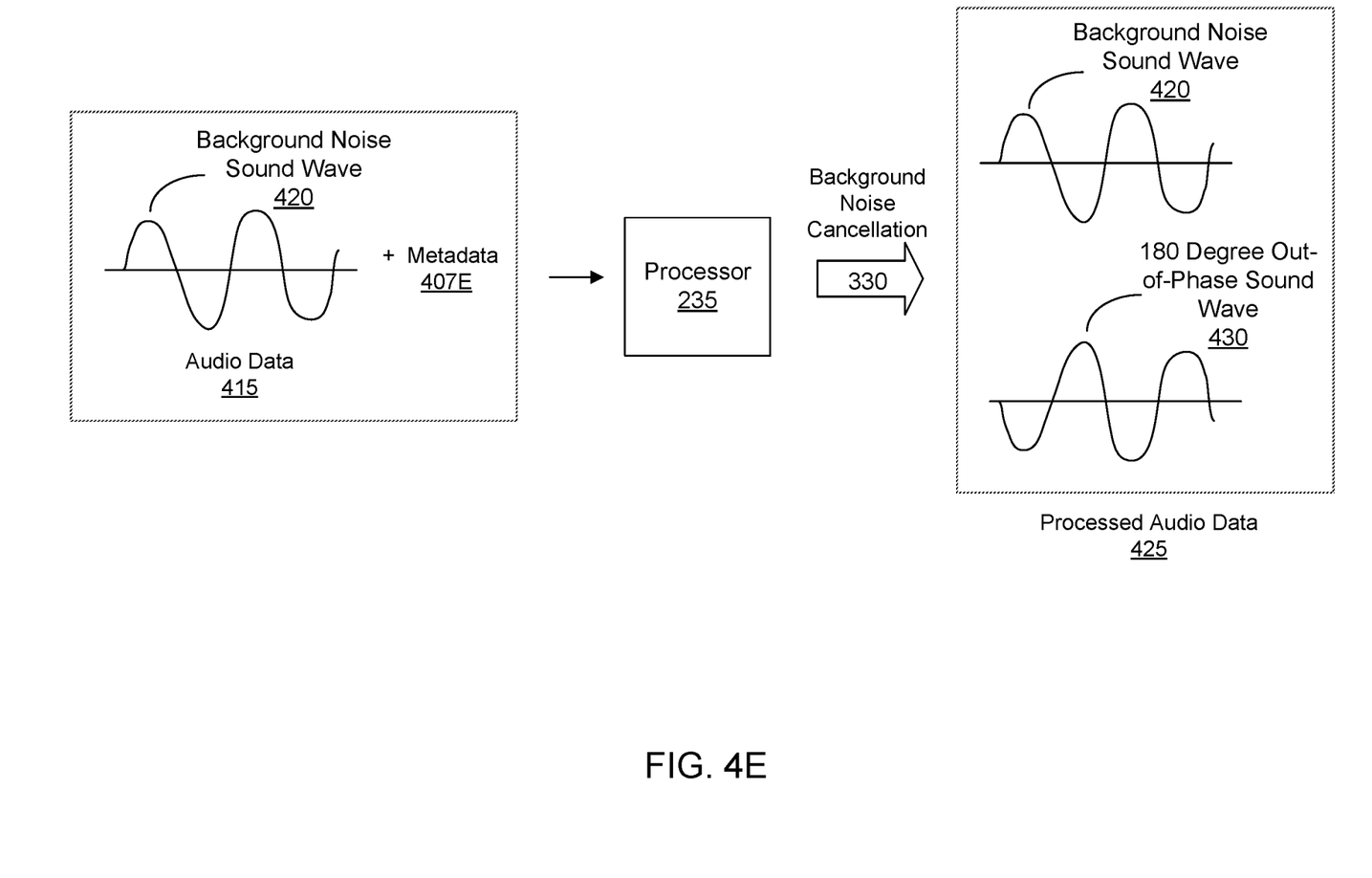
FIG. 4E is an example of enhancing a quality of audio data based on metadata, in accordance with an embodiment.

As shown in the example of FIG. 4E, if the audio data 415 captured 310 at the client device 110A having less processing power includes a background noise (e.g., noise from traffic), the metadata 407E associated with the audio data 415 may indicate that a sound wave 420 corresponding to this background noise has a particular frequency and amplitude. In this example, when the client device 110B having more processing power receives 315, 325 the audio data 415 and the metadata 407E, the client device 110B having more processing power may generate a new sound wave 430 that is 180 degrees out-of-phase with the sound wave 420 corresponding to the background noise. Continuing with this example, when the processed audio data 425 is played, the new sound wave 430 is played in conjunction with the audio data 415 at the client device 110B having more processing power to cancel out the background noise.

Referring back to FIG. 3A, once the client device 110B having more processing power has processed 330 the video data and/or the audio data, the client device 110B having more processing power may display 335 (e.g., using the display area 245) the processed video data and/or play 335 (e.g., using the speaker(s) 250) the processed audio data. For example, the client device 110B having more processing power may display 335 the processed video data, in which the video data has been enhanced in one or more ways (e.g., via image stabilization, color correction, resolution enhancement, reduction of background motion, etc.). In the above example, the client device 110B having more processing power also or alternatively may play 335 the processed audio data, in which the audio data has been enhanced in one or more ways (e.g., via reduction or cancellation of background noises, echo, and/or reverberation).

Referring now to FIG. 3B, in some embodiments, in the system described above with respect to FIG. 3A, once the connection is established 305 (e.g., using the connection module 205) between the client devices 110A-B, video data associated with the user of the client device 110B having more processing power may be captured 310 (e.g., using the camera 210) by the client device 110B having more processing power. In such embodiments, the client device 110B having more processing power also may capture 310 (e.g., using the microphone 215) audio data associated with the user of the client device 110B having more processing power. The client device 110B having more processing power then captures 320 (e.g., using the camera 210 and one or more sensors 220) metadata associated with the video data. Furthermore, the client device 110B having more processing power also may capture 320 (e.g., using the microphone 215 and one or more sensors 220) metadata associated with the audio data. In some embodiments, the client device 110B having more processing power may store the video data and metadata associated with the video data and/or the audio data and metadata associated with the audio data (e.g., in the data store 225).

The client device 110B having more processing power then processes 330 (e.g., using the processor 235) the video data based on the metadata associated with the video data and/or the audio data based on the metadata associated with the audio data, thereby enhancing a quality of the video data and/or the audio data while the client devices 110A-B are connected to each other (e.g., during a video call between the client devices 110A-B). As described above, the quality of the video data may be enhanced by stabilizing images in the video data, correcting one or more colors in the video data, reducing background motion of the video data, enhancing a resolution of the video data, etc., while examples of ways in which the quality of the audio data may be enhanced include reducing or cancelling background noise, echo, reverberation, etc.

Once the client device 110B having more processing power has processed 330 the video data and/or the audio data, the client device 110B having more processing power may transmit 333 (e.g., using the transmitter 240) the processed video data and/or the processed audio data to the client device 110A having less processing power via the connection between the client devices 110A-B. In embodiments in which the client device 110B having more processing power stores the processed video data and/or the processed audio data, the client device 110B having more processing power may transmit 333 the processed video data and/or the processed audio data upon their retrieval (e.g., from the data store 225). In such embodiments, the client device 110B having more processing power may transmit 333 the processed video data and/or the processed audio data based on various types of information stored in association with the processed video data and/or the processed audio data (e.g., information identifying a type of connection (e.g., Bluetooth, Wi-Fi, etc.) between the client devices 110A-B). The processed video data may then be displayed 335 (e.g., using the display area 245) and/or the processed audio data may then be played 335 (e.g., using the speaker(s) 250) at the client device 110A having less processing power.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
    establishing, at a first client device, a videoconferencing session with a second client device in which the first client device and the second client device capture and send video data to the other and display captured video data of the other, and wherein the first client device has more processing power than the second client device;
    receiving, at the first client device, video data captured by the second client device via the connection;
    receiving, at the first client device, metadata associated with the captured video data via the connection;
    processing at the first client device, the captured video data based at least in part on the metadata within a duration of the videoconferencing session, such that a quality of the captured video data is enhanced; and displaying the processed video data at the first client device.

2. The method of claim 1, wherein the first client device and the second client device are capable of capturing and playing audio data.

3. The method of claim 2, further comprising:
receiving audio data captured by the second client device via the connection;
receiving additional metadata associated with the captured audio data via the connection;
processing the captured audio data based at least in part on the additional metadata within the duration of the connection, such that a quality of the captured audio data is enhanced; and
playing the processed audio data at the first client device.

4. The method of claim 3, wherein processing the captured audio data based at least in part on the additional metadata within the duration of the connection comprises:
identifying a background noise included among the captured audio data based at least in part on information comprising the additional metadata describing the background noise; and
generating a sound wave that cancels the background noise included among the captured audio data when played in conjunction with the audio data at the first client device.

5. The method of claim 1, wherein processing the captured video data based at least in part on the metadata within the duration of the connection comprises:
determining a motion of the second client device based at least in part on information comprising the metadata describing the motion of the second client device; and
stabilizing an image included among the captured video data based at least in part on the motion of the second client device.

6. The method of claim 1, wherein processing the captured video data based at least in part on the metadata within the duration of the connection comprises:
identifying information comprising the metadata describing a first measurement associated with a color of a pixel included among the captured video data;
determining a second measurement associated with the color of the pixel included among the captured video data if the pixel were rendered at the first client device;
determining a difference between the first measurement and the second measurement; and
modifying the color of the pixel based at least in part on the difference.

7. The method of claim 1, wherein processing the captured video data based at least in part on the metadata within the duration of the connection comprises:
partitioning a frame included among the captured video data into a plurality of segments based at least in part on information comprising the metadata describing each position of a plurality of pixels comprising the frame;
identifying a background of the frame included among the captured video data corresponding to a set of the plurality of segments;
detecting background motion within the captured video data; and
reducing the background motion within the captured video data.

8. The method of claim 7, wherein the background motion within the captured video data is reduced by blurring the background.

9. The method of claim 7, wherein the first client device corresponds to a stationary device and the second client device corresponds to a mobile device.

10. The method of claim 1, wherein processing the captured video data based at least in part of the metadata within the duration of the connection comprises:
determining whether to enhance a resolution of the captured video data based at least in part on information comprising the metadata describing a context in which the captured video data were captured; and
responsive to determining that the resolution of the captured video data should be enhanced, upsampling a plurality of pixels included among the captured video data.

11. A computer program product comprising a non-transitory computer readable storage medium having instructions encoded thereon that, when executed by a processor, cause the processor to:
establish a videoconferencing session between a first client device and a second client device in which the first client device and the second client device capture and send video data to the other and display captured video data of the other, and wherein the first client device has more processing power than the second client device;
receive, at the first client device, video data captured by the second client device via the connection;
receive, at the first client device, metadata associated with the captured video data via the connection;
process, at the first client device, the captured video data based at least in part on the metadata within a duration of the videoconferencing session, such that a quality of the captured video data is enhanced; and
display the processed video data at the first client device.

12. The computer program product of claim 11, wherein the first client device and the second client device are capable of capturing and playing audio data.

13. The computer program product of claim 12, wherein the computer readable storage medium further has instructions encoded thereon that, when executed by the processor, cause the processor to:
receive audio data captured by the second client device via the connection;
receive additional metadata associated with the captured audio data via the connection;
process the captured audio data based at least in part on the additional metadata within the duration of the connection, such that a quality of the captured audio data is enhanced; and
play the processed audio data at the first client device.

14. The computer program product of claim 13, wherein process the captured audio data based at least in part on the additional metadata within the duration of the connection comprises:
identify a background noise included among the captured audio data based at least in part on information comprising the additional metadata describing the background noise; and
generate a sound wave that cancels the background noise included among the captured audio data when played in conjunction with the audio data at the first client device.

15. The computer program product of claim 11, wherein process the captured video data based at least in part on the metadata within the duration of the connection comprises:
determine a motion of the second client device based at least in part on information comprising the metadata describing the motion of the second client device; and stabilize an image included among the captured video data based at least in part on the motion of the second client device.

16. The computer program product of claim 11, wherein process the captured video data based at least in part on the metadata within the duration of the connection comprises:
   identify information comprising the metadata describing a first measurement associated with a color of a pixel included among the captured video data;
   determine a second measurement associated with the color of the pixel included among the captured video data if the pixel were rendered at the first client device;
   determine a difference between the first measurement and the second measurement; and
   modify the color of the pixel based at least in part on the difference.

17. The computer program product of claim 11, wherein process the captured video data based at least in part on the metadata within the duration of the connection comprises:
   partition a frame included among the captured video data into a plurality of segments based at least in part on information comprising the metadata describing each position of a plurality of pixels comprising the frame;
   identify a background of frame included among the captured video data corresponding to a set of the plurality of segments;
   detect a background motion within the captured video data; and
   reduce the background motion within the captured video data.

18. The computer program product of claim 17, wherein the background motion within the captured video data is reduced by blurring the background.

19. The computer program product of claim 17, wherein the first client device corresponds to a stationary device and the second client device corresponds to a mobile device.

20. The computer program product of claim 11, wherein process the captured video data based at least in part on the metadata within the duration of the connection comprises:
   determine whether to enhance a resolution of the captured video data based at least in part on information comprising the metadata describing a context in which the captured video data were captured; and
   responsive to determining that the resolution of the captured video data should be enhanced, upsample a plurality of pixels included among the captured video data.

* * * * *

UNITED STATES PATENT AND TRADEMARK OFFICE
CERTIFICATE OF CORRECTION

PATENT NO. : 10,834,358 B1  
APPLICATION NO. : 16/237130  
DATED : November 10, 2020  
INVENTOR(S) : Harrison et al.

Page 1 of 1

It is certified that error appears in the above-identified patent and that said Letters Patent is hereby corrected as shown below:

In the Claims

In Column 18, in Claim 1, Line 64, after "processing" insert -- , --.

In Column 20, in Claim 10, Line 5, delete "part of" and insert -- part on --, therefor.

In Column 22, in Claim 17, Line 1, delete "of" and insert -- of the --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*